(12) United States Patent
Okuda et al.

(10) Patent No.: US 10,232,820 B2
(45) Date of Patent: Mar. 19, 2019

(54) STEERING LOCK DEVICE

(71) Applicant: KABUSHIKI KAISHA TOKAI RIKA DENKI SEISAKUSHO, Aichi (JP)

(72) Inventors: Koji Okuda, Aichi (JP); Masakazu Matsumoto, Aichi (JP); Takuma Morishita, Aichi (JP); Takanori Matsuyama, Aichi (JP); Naoki Sekine, Aichi (JP); Mineo Maekawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/710,833

(22) Filed: Sep. 21, 2017

(65) Prior Publication Data

US 2018/0086305 A1 Mar. 29, 2018

(30) Foreign Application Priority Data

Sep. 28, 2016 (JP) .................................. 2016-189961

(51) Int. Cl.
*B60R 25/0215* (2013.01)
*B60R 25/34* (2013.01)

(52) U.S. Cl.
CPC ........ *B60R 25/02153* (2013.01); *B60R 25/34* (2013.01)

(58) Field of Classification Search
CPC .................... G60R 25/02153; B60R 25/02128
See application file for complete search history.

(56) References Cited

U.S. PATENT DOCUMENTS 6,952,059 B1 * 10/2005 Louvel ............. B60R 25/02153
307/10.1

FOREIGN PATENT DOCUMENTS

| DE | 19929435 A1 | 1/2001 |
|---|---|---|
| DE | 102011052007 A1 | 2/2012 |
| JP | 2012-25269 A | 2/2012 |
| JP | 2014-031029 A | 2/2014 |
| JP | 2016-168918 A | 9/2016 |

OTHER PUBLICATIONS

Extended European Search report dated Feb. 9, 2018 issued in European Patent Application No. 17190759.5.
Japanese Office Action dated Jul. 24, 2018 issued in Japanese Patent Application No. 2016-189961.

* cited by examiner

*Primary Examiner* — Vernal U Brown

(57) ABSTRACT

A steering lock device includes a position detector that detects a position of a lock member. The position detector includes a first unlock detecting portion of a digital output type that detects that the lock member is located in an unlock position and a second unlock detecting portion of an analog output type that detects that the lock member is located in an intermediate position, which is between a lock position and the unlock position. A position determination portion determines whether or not the lock member is located in the unlock position based on a detection signal of the first unlock detecting portion and a detection signal of the second unlock detecting portion, which has a parabolic output waveform that changes in accordance with movement of the lock member.

11 Claims, 4 Drawing Sheets

STEERING LOCK DEVICE

CROSS-REFERENCE TO RELATED APPLICATIONS

This application is based upon and claims the benefit of priority from prior Japanese Patent Application No. 2016-189961, filed on Sep. 28, 2016, the entire contents of which are incorporated herein by reference.

FIELD

The present disclosure relates to a steering lock device that is capable of locking a steering wheel.

BACKGROUND

To ensure security against vehicle theft, many vehicles include a steering lock device, which is capable of locking the steering wheel. This type of a steering lock device is usually electrically driven and includes a lock member, which is shifted by a motor or the like from an unlock position to a lock position to lock the steering wheel. Japanese Laid-Open Patent Publication No. 2012-25269 describes the arrangement of magnetic sensors at a lock position and an unlock position to detect whether the lock member is located in the lock position or the unlock position.

SUMMARY

When the lock member is moved from the lock position to the unlock position by the motor, inaccurate detection of the movement of the lock member to the unlock position may hinder control corresponding to the lock state and the unlock state. Thus, the movement of the lock member to the unlock position needs to be accurately detected.

One embodiment of a steering lock device includes a lock member, a position detector configured to detect a position of the lock member, and a detected portion detectable by the position detector. Engagement of the lock member with a recess in a steering shaft sets the steering lock device to a lock state. Disengagement of the lock member from the recess sets the steering lock device to an unlock state. The position detector includes a first unlock detecting portion of a digital output type. The first unlock detecting portion is configured to detect that the lock member is located in an unlock position from a positional relationship with the detected portion. The position detector also includes a second unlock detecting portion of an analog output type. The second unlock detecting portion is configured to detect that the lock member is located in an intermediate position, which is between a lock position and the unlock position, from a positional relationship with the detected portion. The steering lock device further includes a position determination portion configured to determine whether or not the lock member is located in the unlock position based on a detection signal of the first unlock detecting portion and a detection signal of the second unlock detecting portion. The detection signal of the first unlock detecting portion has an output level that changes between a Hi level and a Lo level. The detection signal of the second unlock detecting portion has a parabolic output waveform that changes in accordance with movement of the lock member.

In this configuration, the position determination portion determines whether or not the lock member is located in the unlock position using the detection signal of the second unlock detecting portion, which has an output waveform that changes in the form of a parabola in a zone of the intermediate position between the lock position and the unlock position. At this time, the position determination portion does not simply check the analog output value of the second unlock detecting portion. The position determination portion checks, for example, how the analog output value of the second unlock detecting portion changes over time after the vertex of the parabola of the output waveform. Thus, the position determination portion accurately determines that the lock member is located in the unlock position.

Other aspects and advantages of the embodiments will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a steering lock device 1 will now be described with reference to FIGS. 1 to 5.

Figure 1:
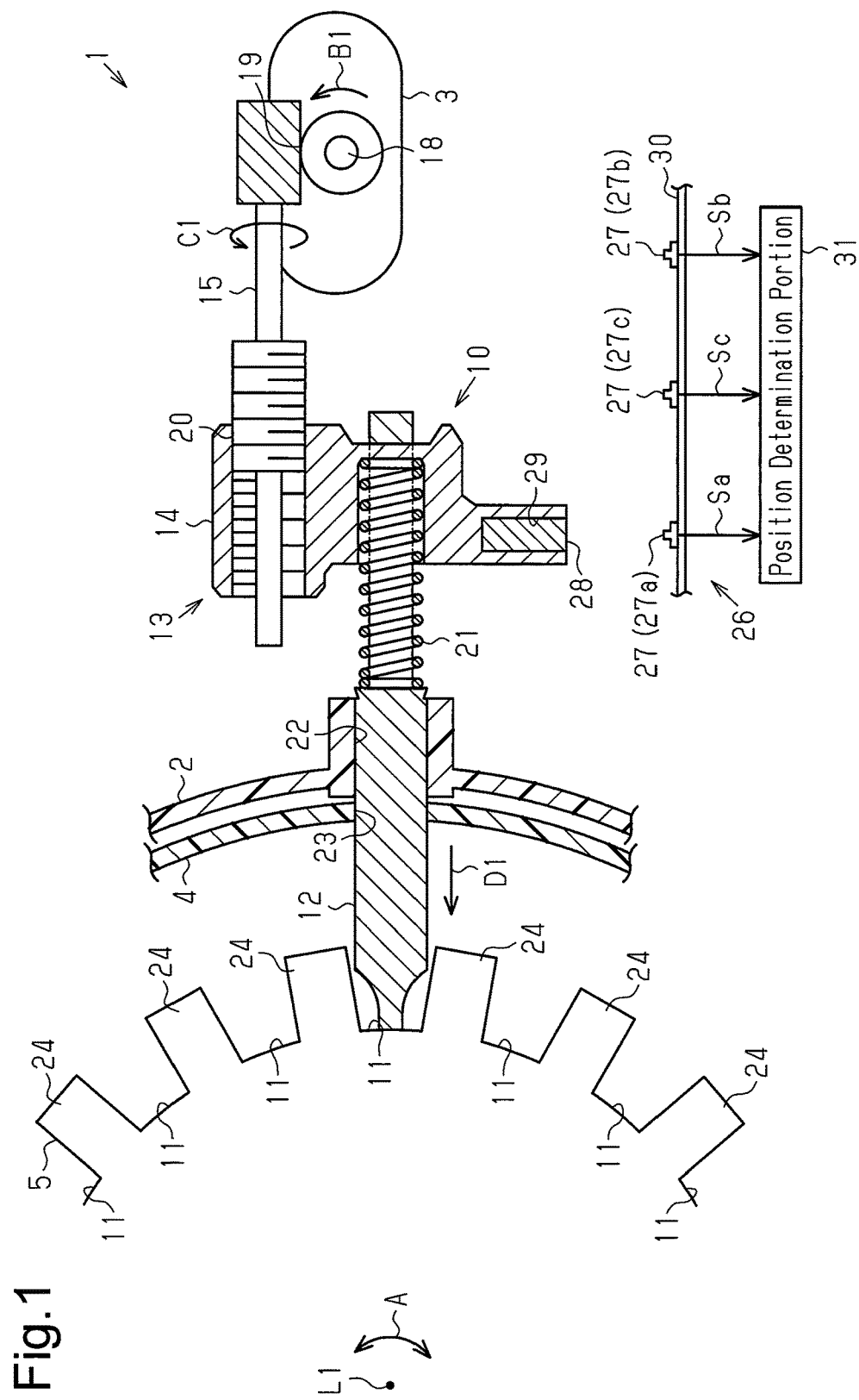
FIG. 1 is an action diagram illustrating one embodiment of a steering lock device that is in a lock state.
Figure 2:
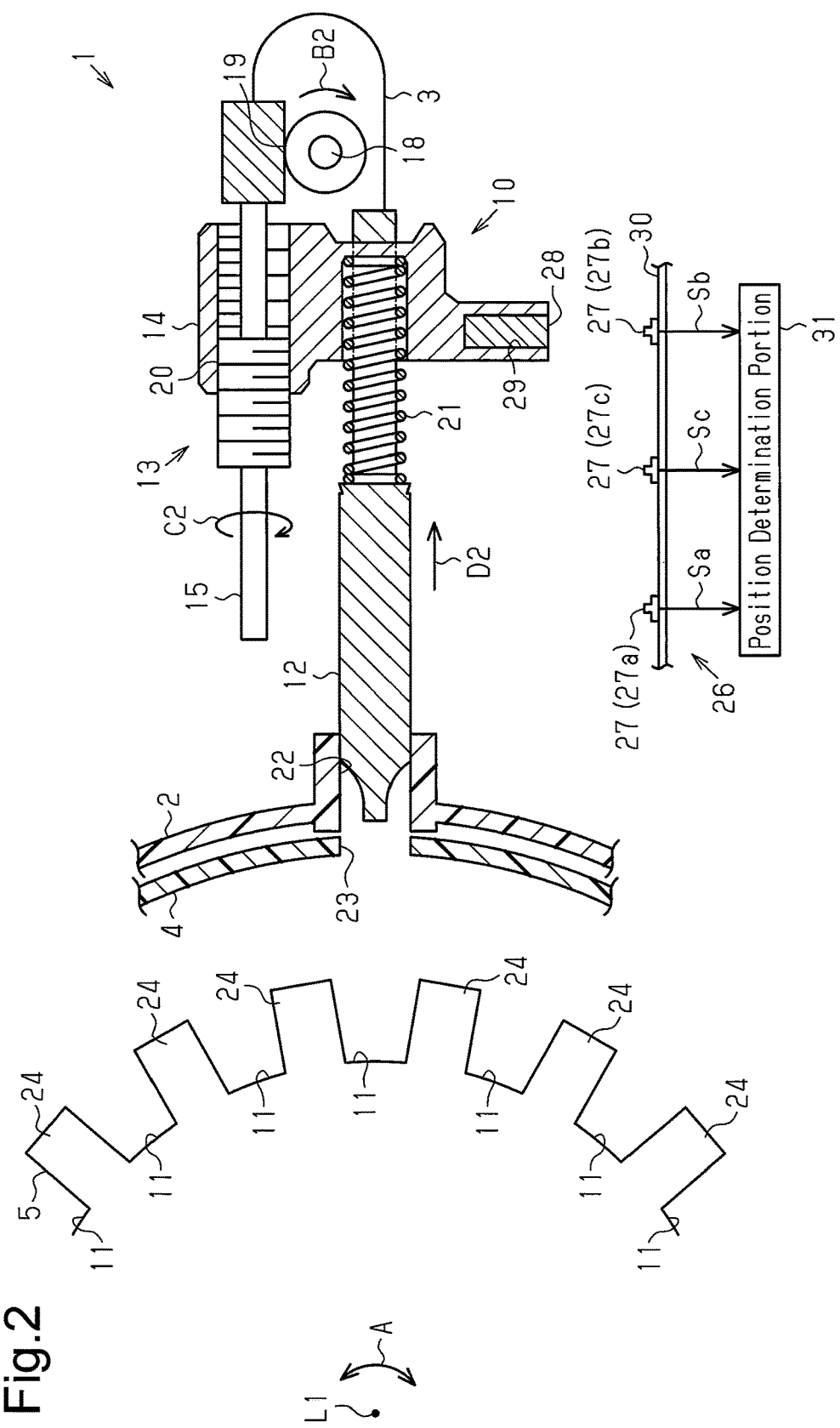
FIG. 2 is an action diagram illustrating the steering lock device that is in an unlock state.

As illustrated in FIGS. 1 and 2, a vehicle such as an automobile includes the steering lock device 1, which is capable of locking a steering wheel. The steering lock device 1 is of an electrically-driven type (electrically-driven steering lock device) and is switched between a lock state and an unlock state based on the driving of a motor 3 (driving source) accommodated in a housing 2. The housing 2 of the steering lock device 1 is fixed to a column tube 4 by a bracket (not illustrated). A steering shaft 5, which is rotated synchronously with the steering wheel, is inserted into the column tube 4 so that the steering shaft 5 is pivotal relative to the column tube 4 about an axis L1 (double headed arcuate arrow A directions in FIGS. 1 and 2).

The steering lock device 1 includes a lock mechanism 10, which is engageable with the steering shaft 5. The lock mechanism 10 includes the motor 3, a lock member 12, which is configured to be engaged with and disengaged from recesses 11 in the steering shaft 5, and a conversion mechanism 13, which converts rotational motion of the motor 3 into linear reciprocation motion of the lock member 12. The conversion mechanism 13 includes a lock stopper 14, which supports the lock member 12, and a rotation shaft 15, which extends between the motor 3 and the lock stopper 14.

The motor 3 includes a motor shaft 18, which is connected to the rotation shaft 15 by a worm gear 19. The rotation shaft 15 is connected to the lock stopper 14 by a ball screw mechanism 20. An urging member 21 is located between the lock member 12 and the lock stopper 14 to constantly urge the lock member 12 into a locking direction (arrow D1 direction in FIG. 1). The lock member 12 is movable to a recess 11 in the steering shaft 5 inserted through a hole 22 formed in the housing 2 and a hole 23 formed in the column tube 4.

When the motor 3 produces rotation in one direction (arrow B1 direction in FIG. 1), the rotation shaft 15 is rotated in an arrow C1 direction illustrated in FIG. 1. This slides the lock stopper 14 and the lock member 12 in the locking direction (arrow D1 direction in FIG. 1). Consequently, the distal end of the lock member 12 engages with one of the recesses 11 in the steering shaft 5. This sets the steering lock device 1 in a lock state (state illustrated in FIG. 1).

When the motor 3 produces rotation in another direction (arrow B2 direction in FIG. 2), the rotation shaft 15 is rotated in an arrow C2 direction illustrated in FIG. 2. This slides the lock stopper 14 and the lock member 12 in an unlocking direction (arrow D2 direction in FIG. 2). As a result, the distal end of the lock member 12 is disengaged from the recess 11 of the steering shaft 5. This sets the steering lock device 1 in an unlock state (state illustrated in FIG. 2).

When the steering lock device 1 is performing the locking action, if the lock member 12 is opposed to one of projections 24 of the steering shaft 5, the lock member 12 interferes with the projection 24 and does not entirely enter the recess 11. At this time, the lock member 12 is semi-engaged with the recess 11. When the steering wheel (steering shaft 5) is rotated by a certain amount so that the lock member 12 is opposed to the recess 11, the lock member 12 is moved in the locking direction into the recess 11 by urging force of the urging member 21. This releases the lock member 12 from the semi-engaged state.

The steering lock device 1 includes a position determination mechanism 26, which determines whether the lock member 12 is located in a lock position or an unlock position. The position determination mechanism 26 includes a position detector 27, which detects the position of the lock member 12, and a detected portion 28, which is detectable by the position detector 27. In the present example, the position detector 27 is arranged on a fixed side member (e.g., housing 2), and the detected portion 28 is arranged on a movable side member (e.g., lock stopper 14). Any detection mechanism may be used as the position determination mechanism 26. In the present example, a magnetic detection mechanism is used. When the detected portion 28 is of a magnetic type, the detected portion 28 may be a magnet that forms a magnetic field around the detected portion 28. The lock stopper 14 has a rear surface including a bore 29. The detected portion 28 is fixed to the wall defining the bore 29. Thus, the detected portion 28 is moved together with the lock member 12.

The position detector 27 includes a lock detecting portion 27a, which detects that the lock member 12 is located in the lock position from the positional relationship with the detected portion 28, a first unlock detecting portion 27b, which detects that the lock member 12 is located in the unlock position from the positional relationship with the detected portion 28, and a second unlock detecting portion 27c, which detects that the lock member 12 is located in an intermediate position of the lock position and the unlock position from the positional relationship with the detected portion 28. The second unlock detecting portion 27c is located in an intermediate position of the lock detecting portion 27a and the first unlock detecting portion 27b. In the present example, the second unlock detecting portion 27c is located in a central (middle) position of the lock detecting portion 27a and the first unlock detecting portion 27b.

When the position determination mechanism 26 is of a magnetic type, each of the lock detecting portion 27a, the first unlock detecting portion 27b, and the second unlock detecting portion 27c is formed by a magnetic sensor that is capable of detecting the magnetic field formed by the magnet (detected portion 28). It is preferred that the magnetic sensor be, for example, an MRE or a Hall IC. The lock detecting portion 27a, the first unlock detecting portion 27b, and the second unlock detecting portion 27c are mounted on a board 30 located in the housing 2.

Each of the lock detecting portion 27a and the first unlock detecting portion 27b is of a digital output type. The lock detecting portion 27a outputs a binarized signal of a Hi level or a Lo level as a detection signal Sa in accordance with the position of the detected portion 28. In the same manner, the first unlock detecting portion 27b outputs a binarized signal of a Hi level or a Lo level as a detection signal Sb in accordance with the position of the detected portion 28. The second unlock detecting portion 27c is of an analog output type. The second unlock detecting portion 27c outputs a detection signal Sc that has a value corresponding to the position of the detected portion 28. The detection signal Sc of the second unlock detecting portion 27c has an output waveform that is, for example, parabolic in correspondence with changes in the position of the detected portion 28.

The steering lock device 1 (position determination mechanism 26) includes a position determination portion 31, which determines the position of the lock member 12 based on outputs of the position detector 27. The position determination portion 31 determines the position of the lock member 12 based on the detection signal Sa of the lock detecting portion 27a, the detection signal Sb of the first unlock detecting portion 27b, and the detection signal Sc of the second unlock detecting portion 27c. In the present example, the position determination portion 31 determines the unlock position of the lock member 12 based on changes in the Hi/Lo level of the first unlock detecting portion 27b and the detection signal Sc of the second unlock detecting portion 27c, in which the parabolic output changes in accordance with the movement of the lock member 12.

The operation and advantages of the steering lock device 1 (electrically-driven steering lock device) will now be described with reference to FIGS. 3 to 5.

Figure 3:
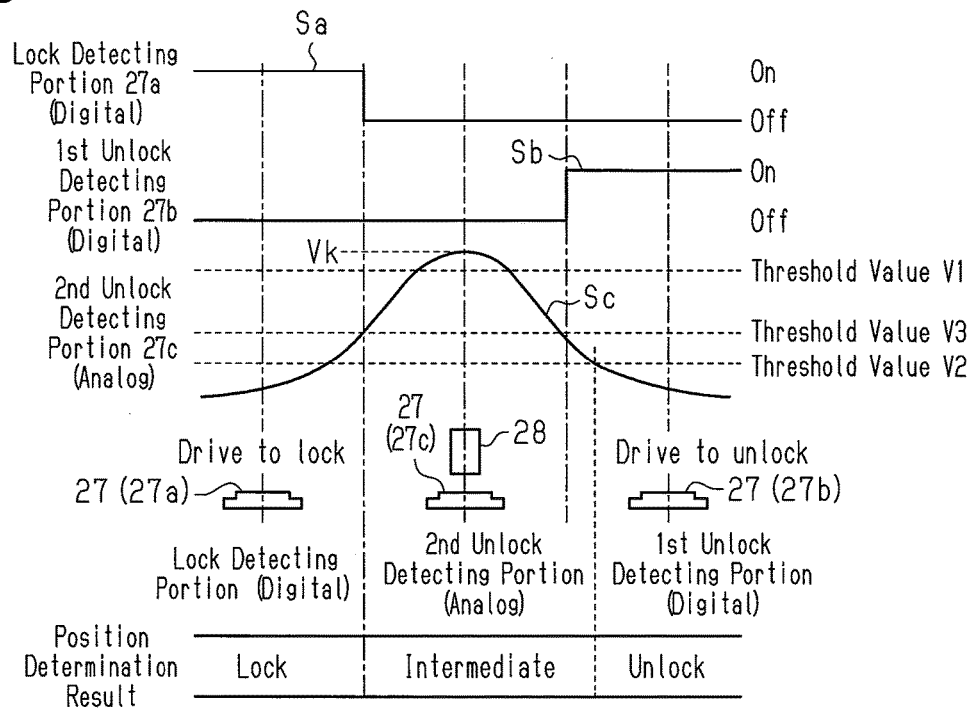
FIG. 3 is a time chart illustrating the method for determining the position of the lock member.

As illustrated in FIG. 3, when the steering lock device 1 is switched from the lock state to the unlock state, the lock member 12 starts to slide from the lock position toward the unlock position due to driving force of the motor 3. At this time, the position of the lock member 12 is shifted from the lock position to the intermediate position and then the unlock position. It is preferred that the condition for starting the unlocking action be, for example, pressing of the engine switch, which is located in the driver seat, with the brake pedal depressed when the smart verification is accomplished.

In the unlocking action, the position determination portion 31 determines the position of the lock member 12 based on the detection signal Sa of the lock detecting portion 27a, the detection signal Sb of the first unlock detecting portion 27b, and the detection signal Sc of the second unlock detecting portion 27c. In the present example, the position determination portion 31 determines that the lock member 12 is located in the lock position when the detection signal Sa of the lock detecting portion 27a corresponds to the Hi level. In the unlocking action, when the position determination portion 31 verifies that the detection signal Sa of the lock detecting portion 27a is shifted from the Hi level to the Lo level and that the detection signal Sb of the first unlock detecting portion 27b corresponds to the Lo level, the position determination portion 31 determines that the lock member 12 is located in the intermediate position of the lock position and the unlock position.

The condition for determining that the lock member 12 is located in the unlock position includes a first determination condition. The first determination condition includes the detection signal Sb of the first unlock detecting portion 27b changing between the Hi level and the Lo level (in present example, change from Lo level to Hi level) and an analog output value (detection signal Sc) of the second unlock detecting portion 27c reaching a first disturbance determination threshold value V1 (more specifically, analog output value becomes greater than threshold value V1) and then reaching a second disturbance determination threshold value V2 (more specifically, analog output value becomes smaller than threshold value V2). The first disturbance determination threshold value V1 is set to a value close to a vertex Vk of the parabolic output waveform. The second disturbance determination threshold value V2 is set to a value of the output waveform that is sufficient to determine that the lock member 12 has reached the unlock position. The first disturbance determination threshold value V1 is used to determine whether or not the analog output value of the second unlock detecting portion 27c reaches the vertex Vk (peak) of the output waveform. The second disturbance determination threshold value V2 is used to verify that the analog output value of the second unlock detecting portion 27c is sufficiently decreased so that the lock member 12 is located in the unlock position.

The condition for determining that the lock member 12 is located in the unlock position includes a second determination condition. The second determination condition includes the analog output value (detection signal Sc) of the second unlock detecting portion 27c reaching a sensitivity determination threshold value V3 (more specifically, analog output value is smaller than threshold value V3) when the detection signal Sb of the first unlock detecting portion 27b is changed between the Hi level and the Lo level (in present example, change from Lo level to Hi level). The sensitivity determination threshold value V3 is used to determine whether or not the sensitivity of the first unlock detecting portion 27b is normal, that is, the first unlock detecting portion 27b is non-defective. For example, the sensitivity determination threshold value V3 is set to a value between the first disturbance determination threshold value V1 and the second disturbance determination threshold value V2.

When the position determination portion 31 verifies that the first determination condition and the second determination condition are both satisfied, the position determination portion 31 determines that the lock member 12 is located in the unlock position. When the position determination portion 31 determines that the lock member 12 is located in the unlock position, the steering lock device 1 permits the engine to start. The position determination portion 31 correctly recognizes the movement of the lock member 12 from the lock position to the unlock position. When the engine switch is operated to start the engine, the engine start is permitted based on the determination result of the position determination portion 31. This prevents, for example, the permission of the engine start by determining the unlock state when the lock member 12 is, in fact, not located in the unlock position.

Figure 4:
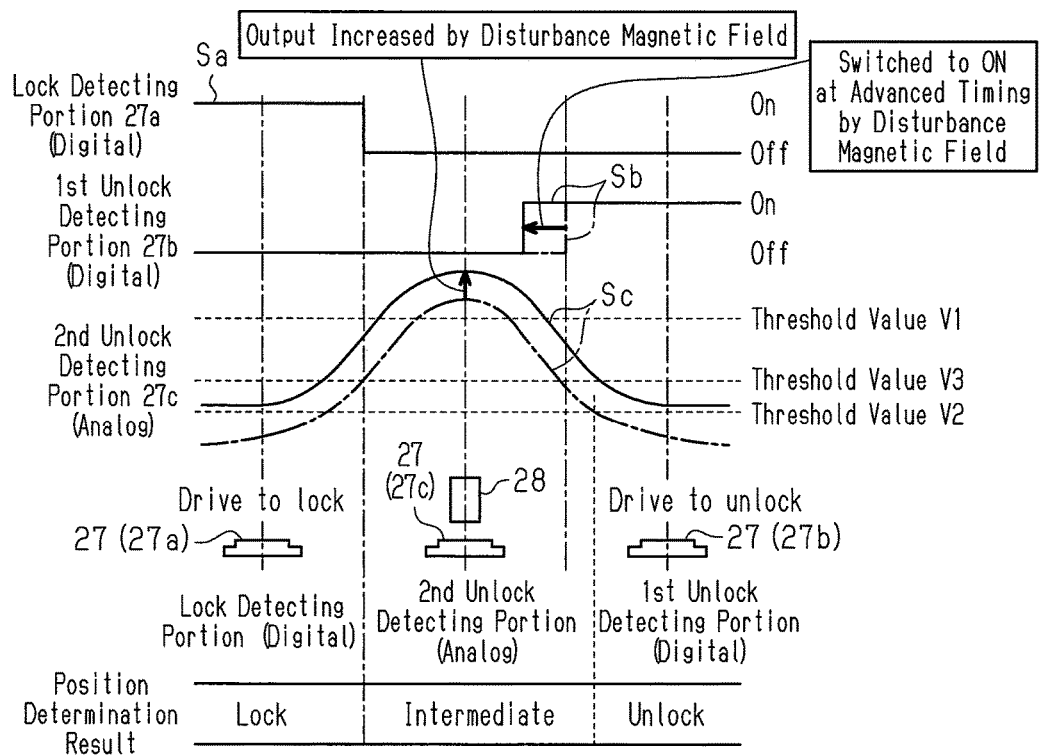
FIG. 4 is a time chart illustrating changes in outputs when a disturbance magnetic field is generated.

FIG. 4 illustrates an example in which a disturbance magnetic field is generated in the steering lock device 1. As illustrated in FIG. 4, when a disturbance magnetic field is generated, the first unlock detecting portion 27b receives the effect of the disturbance magnetic field and is switched from the Lo level to the Hi level at an advanced timing. Additionally, the generation of a disturbance magnetic field relatively increases the analog output value of the second unlock detecting portion 27c as compared to when no disturbance magnetic field is generated. Thus, when the disturbance magnetic field is generated, the output waveform may change so that the analog output value of the second unlock detecting portion 27c is not decreased to below the second disturbance determination threshold value V2.

When the position determination portion 31 verifies that the analog output value of the second unlock detecting portion 27c is not decreased to below the second disturbance determination threshold value V2 within a fixed time even though the output level of the first unlock detecting portion 27b is changed (in present example, from Lo level to Hi level), the position determination portion 31 determines that the first determination condition is unsatisfied. When the first determination condition is unsatisfied, the position determination portion 31 processes the unlock determination as "the determination error." In this case, for example, the determination error is notified to the user in the vehicle, or the unlocking action is retried.

When the disturbance magnetic field is generated, the unlock position will not be determined despite the fact that the lock member 12 is located in the unlock position. In this situation, the priority is given to the maintenance of the lock state without performing the control corresponding to the lock state and the unlock state.

Figure 5:
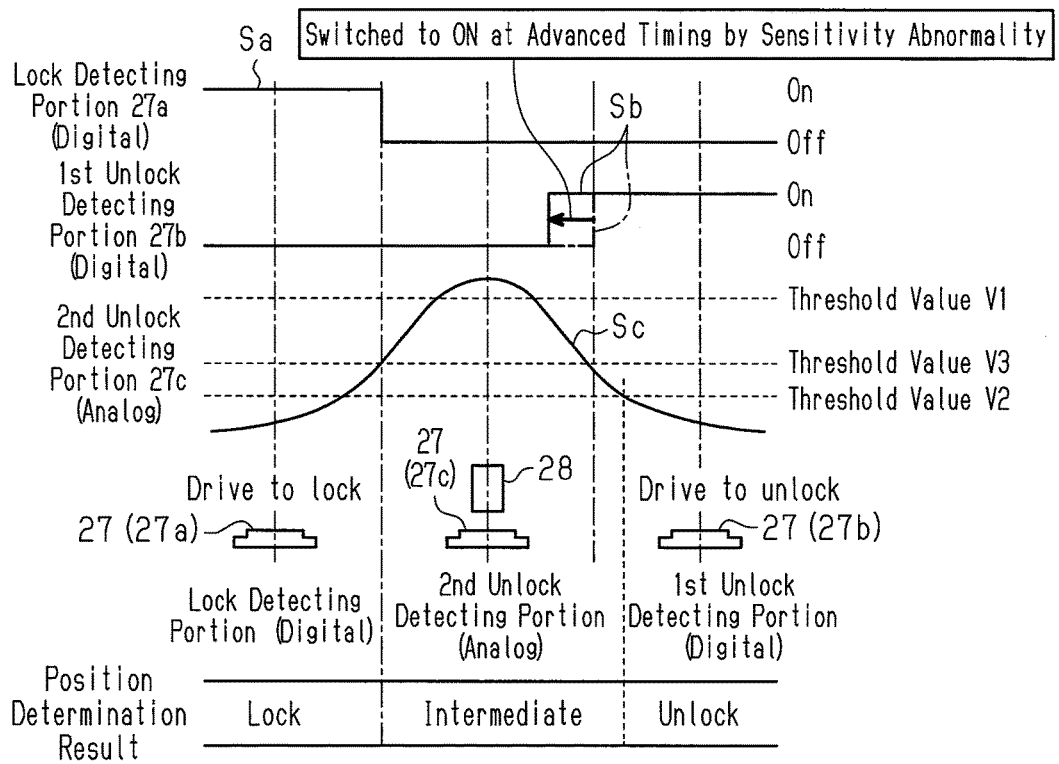
FIG. 5 is a time chart illustrating changes in outputs when a sensing abnormality occurs.

FIG. 5 illustrates an example in which the sensitivity of the first unlock detecting portion 27b is abnormal. FIG. 5 illustrates an example of the sensitivity abnormality that switches the first unlock detecting portion 27b from the Lo level to the Hi level at an advanced timing. During the occurrence of the sensitivity abnormality, the analog output value of the second unlock detecting portion 27c may not be decreased to below the sensitivity determination threshold value V3 at the point in time when the first unlock detecting portion 27b is switched between the Hi level and the Lo level.

Even when the output waveform is changed so that the analog output value of the second unlock detecting portion 27c becomes greater than the first disturbance determination threshold value V1 and then becomes smaller than the second disturbance determination threshold value V2, if the position determination portion 31 verifies that the analog output value of the second unlock detecting portion 27c is not below the sensitivity determination threshold value V3 at the point in time when the first unlock detecting portion 27b is switched between the Hi level and the Lo level, the position determination portion 31 determines that the second determination condition is unsatisfied. When the second determination condition is unsatisfied, the position determination portion 31 processes the unlock determination as "the determination error." In this case, for example, the determination error is notified to the user in the vehicle, or the unlocking action is retried. During the occurrence of the sensitivity abnormality, even if the lock member 12 is located in the unlock position, the priority is given to the maintenance of the lock state without performing the control corresponding to the unlock state.

As described above, the position determination portion 31 of the present example determines whether or not the lock member 12 is located in the unlock position using the detection signal Sc of the second unlock detecting portion 27c, which has the output waveform that changes in the form of a parabola in the zone of the intermediate position between the lock position and the unlock position. At this time, the position determination portion 31 does not simply check the analog output value of the second unlock detecting portion 27c. The position determination portion 31 checks, for example, how the analog output value of the second unlock detecting portion 27c changes over time after the vertex Vk of the parabola of the output waveform. Thus, the position determination portion 31 accurately determines that the lock member 12 is located in the unlock position.

In the present example, each of the lock detecting portion 27a and the first unlock detecting portion 27b is of a digital output type. The lock detecting portion 27a and the first unlock detecting portion 27b are located in positions similar to those of the prior art (i.e., positions corresponding to lock position and unlock position). This eliminates the need for changing the extension dimension of the lock member 12 from a prior art product.

The position determination portion 31 determines the position of the lock member 12 based on the detection signal Sa of the lock detecting portion 27a, the detection signal Sb of the first unlock detecting portion 27b, and the detection signal Sc of the second unlock detecting portion 27c. The use of the three detection signals Sa to Sc to determine the position of the lock member 12 is further advantageous for ensuring the accuracy for detecting the unlock position.

The condition for determining that the lock member 12 is located in the unlock position includes the first determination condition, which has been described. For example, when disturbance (disturbance magnetic field) occurs and affects the outputs of the position detector 27 (lock detecting portion 27a, first unlock detecting portion 27b, and second unlock detecting portion 27c) of the steering lock device 1, the value of the detection signal Sc of the second unlock detecting portion 27c will not reach the second disturbance determination threshold value V2. Thus, when the first determination condition is unsatisfied, the position determination portion 31 may determine that the steering lock device 1 is affected by the disturbance (disturbance magnetic field). This prevents an erroneous determination that the lock member 12 is located in the unlock position in an unstable situation where the disturbance (disturbance magnetic field) occurs.

The condition for determining that the lock member 12 is located in the unlock position includes the second determination condition, which has been described. For example, during the occurrence of the sensitivity abnormality in the first unlock detecting portion 27b, the Hi/Lo level of the first unlock detecting portion 27b is changed at an advanced timing. Thus, when the second determination condition is not satisfied, the position determination portion 31 may determine that the sensitivity of the first unlock detecting portion 27b is abnormal. Therefore, the position determination portion 31 detects the sensitivity abnormality of the first unlock detecting portion 27b by determining whether or not the second determination condition is satisfied.

Each of the first unlock detecting portion 27b and the second unlock detecting portion 27c may be a magnetic sensor. When the first unlock detecting portion 27b and the second unlock detecting portion 27c are magnetic sensors, output values of the magnetic sensors may be affected by, for example, the disturbance magnetic field or the sensitivity abnormality of the sensors. However, even if such a situation occurs, the correct position determination result is obtained based on the combination of the output values of the first unlock detecting portion 27b and the second unlock detecting portion 27c.

It should be apparent to those skilled in the art that the present disclosure may be embodied in many other specific forms without departing from the scope of the invention. Particularly, it should be understood that the present disclosure may be embodied in the following forms.

Figure 6:
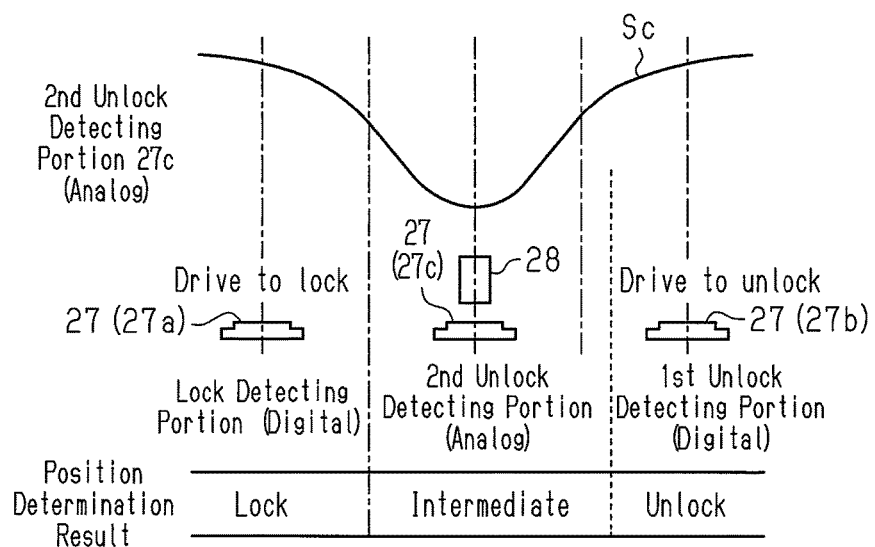
FIG. 6 is a diagram illustrating an output waveform of a modified example of a second unlock detecting portion.

As illustrated in FIG. 6, the output waveform of the second unlock detecting portion 27c is not limited to an output waveform having a peak of the parabola in the zone of the intermediate position between the lock position and the unlock position. The output waveform may have a bottom of the parabola in the zone of the intermediate position between the lock position and the unlock position.

The structure of the lock mechanism 10 may be changed to a structure other than the above embodiment.

The Hi/Lo levels, which correspond to the digital outputs of the lock detecting portion 27a and the first unlock detecting portion 27b, may be inverted from the above embodiment.

The position detector 27 is not limited to the magnetic sensor and may be changed to another member such as an optical sensor (e.g., light receiving element). Additionally, the detected portion 28 may be changed to a member other than the magnet (e.g., light emitting element).

When the position detector 27 is coupled to a movable side member (e.g., lock member 12 or lock stopper 14), the detected portion 28 may be coupled to a fixed side member (e.g., housing 2).

The position determination portion 31 only needs to determine the unlock position of the lock member 12 at least using the outputs of the first and second unlock detecting portions 27b, 27c.

The above embodiment is not limited to a case in which the disturbance magnetic field and the sensitivity abnormality separately occur. The above embodiment may be applied to a case in which the combination of the disturbance magnetic field and the sensitivity abnormality occurs.

The steering lock device 1 is not limited to an electrically-driven type and may be, for example, of a mechanical type that is actuated when the user manually operates.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A steering lock device comprising:
   a lock member;
   a position detector configured to detect a position of the lock member; and
   a detected portion detectable by the position detector,
      wherein
   the lock member is configured so that engagement of the lock member with a recess in a steering shaft sets the steering lock device to a lock state and so that disengagement of the lock member from the recess sets the steering lock device to an unlock state, the position detector includes
- a lock detecting portion of a digital output type, wherein the lock detecting portion is configured to detect that the lock member is located in a lock position,
- a first unlock detecting portion of a digital output type, wherein the first unlock detecting portion is configured to detect that the lock member is located in an unlock position from a positional relationship with the detected portion, and
- a second unlock detecting portion of an analog output type, wherein the second unlock detecting portion is located in an intermediate position between the lock detecting portion and the first unlock detecting portion and configured to detect that the lock member is located in an intermediate position, which is between the lock position and the unlock position, from a positional relationship with the detected portion, and the steering lock device further comprises a position determination portion configured to determine whether or not the lock member is located in the unlock position based on a detection signal of the first unlock detecting portion and a detection signal of the second unlock detecting portion, wherein the detection signal of the first unlock detecting portion has an output level that changes between a Hi level and a Lo level, and the detection signal of the second unlock detecting portion has a parabolic output waveform that changes in accordance with movement of the lock member.

2. The steering lock device according to claim 1, wherein a condition for determining that the lock member is located in the unlock position includes
the detection signal of the first unlock detecting portion changing between the Hi level and the Lo level, and
the detection signal of the second unlock detecting portion reaching a first disturbance determination threshold value, which is set to a value close to a vertex of the parabolic output waveform, and then reaching a second disturbance determination threshold value, which is set to a value of the output waveform that is sufficient to determine that the lock member has reached the unlock position.

3. The steering lock device according to claim 1, wherein a condition for determining that the lock member is located in the unlock position includes the detection signal of the second unlock detecting portion reaching a sensitivity determination threshold value when the detection signal of the first unlock detecting portion changes between the Hi level and the Lo level, and
the sensitivity determination threshold value is set to determine whether or not the first unlock detecting portion has a normal sensitivity.

4. The steering lock device according to claim 1, wherein each of the first unlock detecting portion and the second unlock detecting portion comprises a magnetic sensor.

5. A steering lock device comprising:
a lock member;
a position detector configured to detect a position of the lock member; and
a detected portion detectable by the position detector, wherein
the lock member is configured so that engagement of the lock member with a recess in a steering shaft sets the steering lock device to a lock state and so that disengagement of the lock member from the recess sets the steering lock device to an unlock state, the position detector includes
a first unlock detecting portion of a digital output type, wherein the first unlock detecting portion is configured to detect that the lock member is located in an unlock position from a positional relationship with the detected portion, and
a second unlock detecting portion of an analog output type, wherein the second unlock detecting portion is configured to detect that the lock member is located in an intermediate position, which is between a lock position and the unlock position, from a positional relationship with the detected portion, and the steering lock device further comprises a position determination portion configured to determine whether or not the lock member is located in the unlock position based on a detection signal of the first unlock detecting portion and a detection signal of the second unlock detecting portion, wherein the detection signal of the first unlock detecting portion has an output level that changes between a Hi level and a Lo level, and the detection signal of the second unlock detecting portion has a parabolic output waveform that changes in accordance with movement of the lock member, wherein a condition for determining that the lock member is located in the unlock position includes
the detection signal of the first unlock detecting portion changing between the Hi level and the Lo level, and
the detection signal of the second unlock detecting portion reaching a first disturbance determination threshold value, which is set to a value close to a vertex of the parabolic output waveform, and then reaching a second disturbance determination threshold value, which is set to a value of the output waveform that is sufficient to determine that the lock member has reached the unlock position.

6. The steering lock device according to claim 5, wherein the position detector further includes a lock detecting portion of a digital output type, wherein the lock detecting portion is configured to detect that the lock member is located in the lock position, and
the position determination portion is configured to determine the position of the lock member based on a detection signal of the lock detecting portion, the detection signal of the first unlock detecting portion, and the detection signal of the second unlock detecting portion.

7. The steering lock device according to claim 5, wherein the condition for determining that the lock member is located in the unlock position further includes the detection signal of the second unlock detecting portion reaching a sensitivity determination threshold value when the detection signal of the first unlock detecting portion changes between the Hi level and the Lo level, and
the sensitivity determination threshold value is set to determine whether or not the first unlock detecting portion has a normal sensitivity.

8. The steering lock device according to claim 5, wherein each of the first unlock detecting portion and the second unlock detecting portion comprises a magnetic sensor.

9. A steering lock device comprising:
a lock member;
a position detector configured to detect a position of the lock member; and a detected portion detectable by the position detector, wherein the lock member is configured so that engagement of the lock member with a recess in a steering shaft sets the steering lock device to a lock state and so that disengagement of the lock member from the recess sets the steering lock device to an unlock state, the position detector includes
- a first unlock detecting portion of a digital output type, wherein the first unlock detecting portion is configured to detect that the lock member is located in an unlock position from a positional relationship with the detected portion, and
- a second unlock detecting portion of an analog output type, wherein the second unlock detecting portion is configured to detect that the lock member is located in an intermediate position, which is between a lock position and the unlock position, from a positional relationship with the detected portion, and the steering lock device further comprises a position determination portion configured to determine whether or not the lock member is located in the unlock position based on a detection signal of the first unlock detecting portion and a detection signal of the second unlock detecting portion, wherein the detection signal of the first unlock detecting portion has an output level that changes between a Hi level and a Lo level, and the detection signal of the second unlock detecting portion has a parabolic output waveform that changes in accordance with movement of the lock member, wherein a condition for determining that the lock member is located in the unlock position includes the detection signal of the second unlock detecting portion reaching a sensitivity determination threshold value when the detection signal of the first unlock detecting portion changes between the Hi level and the Lo level, and the sensitivity determination threshold value is set to determine whether or not the first unlock detecting portion has a normal sensitivity.

10. The steering lock device according to claim 9, wherein
the position detector further includes a lock detecting portion of a digital output type, wherein the lock detecting portion is configured to detect that the lock member is located in the lock position, and the position determination portion is configured to determine the position of the lock member based on a detection signal of the lock detecting portion, the detection signal of the first unlock detecting portion, and the detection signal of the second unlock detecting portion.

11. The steering lock device according to claim 9, wherein each of the first unlock detecting portion and the second unlock detecting portion comprises a magnetic sensor.

* * * * *